United States Patent [19]

Senda et al.

[11] 4,430,717
[45] Feb. 7, 1984

[54] MACHINE TOOL

[75] Inventors: Masaki Senda, Komaki; Takashi Mizoguchi, Kasugai, both of Japan

[73] Assignee: Okuma Howa Kikai Kabushiki Kaisha, Kounan, Japan

[21] Appl. No.: 290,771

[22] Filed: Aug. 6, 1981

[30] Foreign Application Priority Data

Aug. 15, 1980 [JP] Japan ................................ 55-112847

[51] Int. Cl.³ ............................................. G06F 15/46
[52] U.S. Cl. .................................... 364/474; 29/568;
198/349; 364/170; 364/478
[58] Field of Search ........ 364/468, 474, 475, 167–171, 364/478, 200 MS File, 900 MS File; 29/568, 33 P; 209/546, 547; 198/339, 340, 341, 348, 349, 502; 414/134–136; 211/1.5

[56] References Cited

U.S. PATENT DOCUMENTS

| 3,576,540 | 4/1971 | Fair et al. | 364/167 X |
| 3,716,128 | 2/1973 | Edge et al. | 198/349 X |
| 3,744,124 | 7/1973 | Gardner | 29/568 |
| 3,952,388 | 4/1976 | Hasegawa et al. | 198/349 X |
| 4,237,598 | 12/1980 | Williamson | 364/474 X |
| 4,309,600 | 1/1982 | Perry et al. | 364/468 X |

Primary Examiner—Joseph F. Ruggiero
Attorney, Agent, or Firm—Oblon, Fisher, Spivak, McClelland & Maier

[57] ABSTRACT

In a numerically-controlled machine tool having a tool magazine accommodating tools in the pots, display means capable of rewriting tool numbers in correspondence to the pots is provided, and the positions where the tool numbers are stored are successively shifted in a memory in response to instruction signals applied from the machine tool side in response to the selection or exchange of the tools, so that the display of the tool numbers of the tools in the magazine is changed in synchronization with the tool displacement.

1 Claim, 9 Drawing Figures

MACHINE TOOL

BACKGROUND OF THE INVENTION

This invention relates to a numerically-controlled machine tool (hereinafter referred to as "a machining center", when applicable) which has a tool magazine accommodating a plurality of tools which are automatically replaced by a tool exchanging arm, and can display the tool numbers assigned to the tools in the magazine.

In general, in the case where, in a machining center having a tool magazine accommodating tools, tools for which numbers assigned to the tool accommodating pots of the magazine are stored as tool numbers must be returned to the respective pots. Accordingly, in returning a tool, the tool magazine must be positioned during the standby period so that its own pot comes to the tool exchange position, and it is necessary to provide an auxiliary station for the machining center to grasp the next tool.

In the case where coded tool numbers are provided on the tools themselves, or tool numbers are stored in the memory device of a control unit in advance, the tools themselves have their own tool numbers, and therefore it is not always necessary to return the tools to the predetermined pots. However, a satisfactory display means for recognizing the tool numbers are not provided for the conventional machining center, and means for showing the change of all of the tool numbers due to tool displacement or exchange is not provided for the machining center.

SUMMARY OF THE INVENTION

In view of the foregoing, an object of this invention is to provide a numerically-controlled machine tool of the above-described type in which a tool number is allowed to follow after a tool being displaced to readily recognize it, and even in the case of replacement of a tool, the tool number display is effected in correspondence to the tool replacement, whereby all the tool numbers can be recognized at a glance in response to the tool displacement.

The foregoing object and other objects of the invention have been achieved by the provision of a numerically-controlled tool machine comprising a tool magazine accommodating a number of tools and indexed selectively, and a tool exchanging arm turnable and axially movable between the magazine and the spindle rotatably coupled to the spindle head to exchange the tool, and being able optionally to set and store tool numbers in memory means in control means according to an operation program; which, according to the invention, comprises: display means for displaying the stored tool numbers in response to instructions and rewriting the tool number thus displayed in response to instruction; and means for shifting positions where the tool numbers are stored in synchronization with tool displacement attributing to tool selection or exchange, whereby the tool numbers displayed by the display means are changed in association with the tool displacement.

The nature, principle and utility of the invention will become more apparent from the following detailed description when read in conjunction with the accompanying drawings.

DETAILED DESCRIPTION OF THE INVENTION

Figure 1:
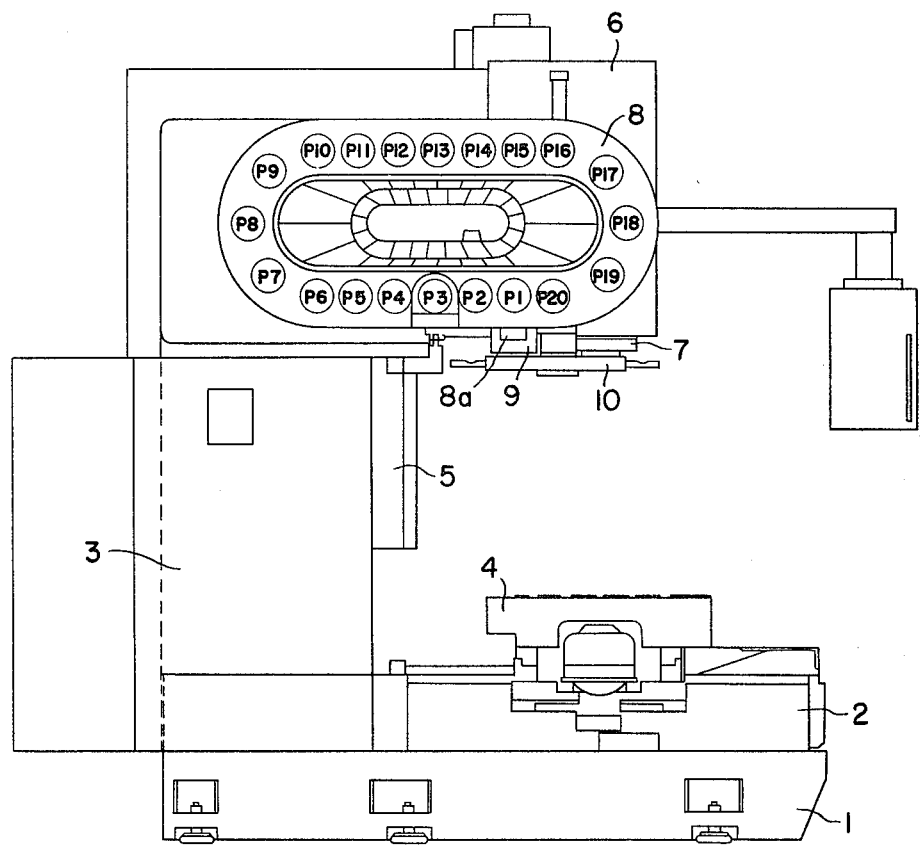
FIG. 1 is a side view of a machining center according to this invention.

As shown in FIG. 1, a saddle 2 is provided on the bed 1 of a machine tool in such a manner that it is slidable back and forth along a horizontal guide surface. The saddle 2 is driven by instructions from a numerical control device 3. A table 4 slidable right and left along a horizontal guide surface is provided on the saddle 2. A workpiece is set on the table 4. The table 4 is also driven by instructions from the numerical control device 3. A column 5 is set upright behind the saddle 2. A spindle head 6 is driven along a front vertical guide surface by instructions from the numerical control device 3. The spindle head 6 is provided on the column 5 in such a manner that it is slidable vertically. A spindle 7 to which a tool is detachably coupled is rotatably supported by the spindle head 6. A magazine 8 holding a plurality of tools horizontally is provided on a side of the spindle head 6. A plurality of pots $P_1$ through $P_{20}$ for accommodating the tools are endlessly coupled to one another in the magazine. In response to instructions, the pots are turned clockwise or counterclockwise and indexed so that the indexed pot can reach more quickly the tool exchange position $P_1$. At the tool exchange position, the pot is turned vertically by a sub-arm 9 according to an instruction while holding the tool in response to an instruction, and is then held in standby state. At the tool fixing position $P_3$, the necessary tool is inserted or replaced manually.

A tool exchanging arm 10 with gripping parts which open in opposite directions on both sides is provided between the spindle 7 and a pot 8a which has been turned vertically. The tool exchanging arm 10 is so designed that it is turned horizontally from the standby position to the exchange position and vice versa and is slidable in the vertical axis direction to mount or demount a tool.

What has been described above is a machining center well known in the art. In order to confirm the operations of various parts of the machining center, limit switches are provided at essential positions on the machining center. In the invention, two limit switches are provided in order to obtain a signal which is produced for a display-transfer signal I (described later) in response to the turn of the tool exchanging arm 10 in exchanging a tool, and to obtain a signal for discriminating a display-transfer signal II and an indexing turn direction. The two limit switches produce signals whenever a sprocket wheel indexing the magazine comes one pitch before the indexing position.

Two-digit light emission diodes $L_1$ through $L_{20}$ are provided for the magazine 8, to display numbers corresponding to the positions of the pots. Furthermore, a two-digit light emission diode $L_0$ is provided to display a number of a tool which is fixed to the spindle (cf. FIG. 3). Instead of the light emission diodes, display means such as plasma display for displaying numbers with binary-coded signals may be employed, or an electro-magnetic mechanical display means may be employed.

Figure 2:
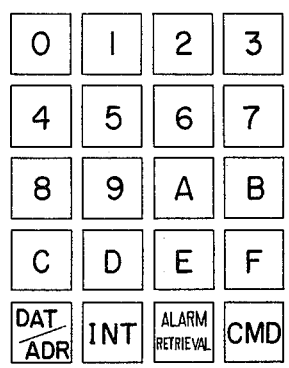
FIG. 2 is an explanatory diagram showing the panel of a keyboard unit.
Figure 3:
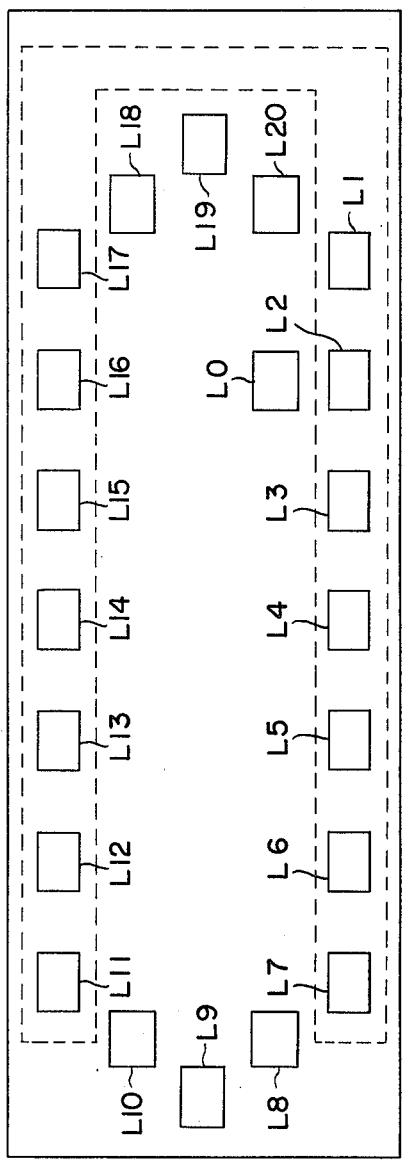
FIG. 3 is an explanatory diagram showing a display unit for displaying tool numbers.

A control system for operating the light emission diodes and synchronizing the operations of the light emission diodes with the display numbers in association with a tool movement accompanying a tool selection and a tool exchange, will be described with reference to FIGS. 2, 3 and 4.

A keyboard unit 20 (FIG. 2) is provided on the operation panel of the numerical control device 3 described above. The key board unit 20 has key switches 0, 1, 2, . . . and 9 and A, B, C, . . . and F for hexadecimal coding and key switches DAT/ADR, INT, ALARM RETRIEVAL and CMD. The keyboard unit 20 is connected to an address bus A and a data bus of a sequencer 30 (described later), to input data into a RAM in a data memory (described later). Upon reception of the input data, the sequencer 30 stores a tool number in a predetermined address in the data memory. When the display-transfer signals I and II and clockwise and counterclockwise signals are inputted into an interface, the sequencer transfers the data stored in the memory to operate a display unit 40 (FIG. 3) comprising the abovedescribed light emission diodes, which is connected to the address bus A and the data bus D.

The sequencer will be described with reference to FIG. 4.

A first control circuit 301 for producing timing clock pulses is connected to the address bus A and the data bus D. That is, the first control circuit 301 provides timing signals for time-division operations of various elements (described later). A display addressing unit 302 is also connected to the address bus A and the data bus D, to specify addresses in a data memory (described later). A program memory 303 comprises an erasable, programmable read-only memory (EPROM). A program necessary for execution of instructions is stored in the program memory 303. The memory 303 is also connected to the address bus A and the data bus D. A program counter 304 operates to specify addresses in the EPROM of the program memory 303.

Figure 4:
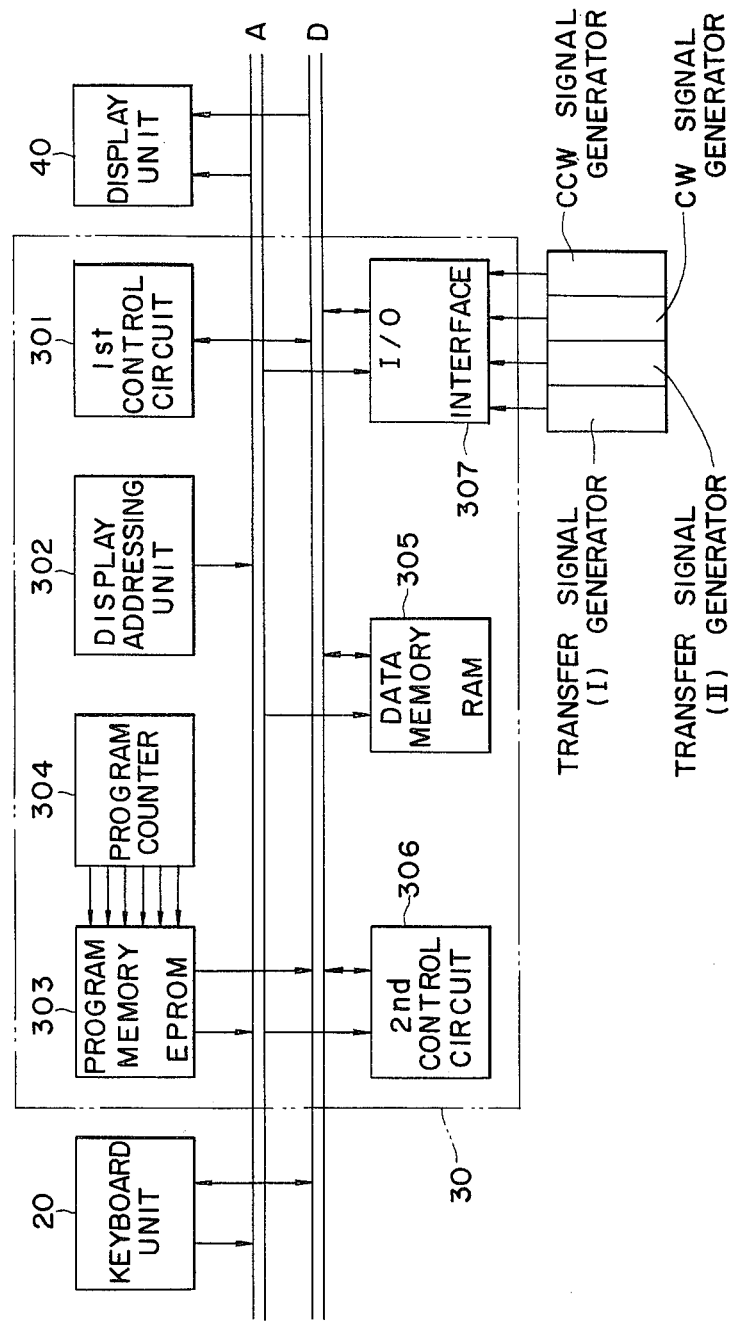
FIG. 4 is a block diagram showing a control system for a display means.

Further in FIG. 4, reference numeral 305 designates a data memory in which data are stored in hexadecimal notation. The data memory 30 comprises a random access memory (RAM) having a capacity of twenty-two bytes for addresses for twenty tools accommodated in the magazine, an address for the spindle and an address for temporarily retracting data (cf. FIG. 9). The data memory 30 is connected to the address bus A and the data bus D. A second control circuit 306 is connected to the address bus A and the data bus D, to exchange data with the program memory 303. An I/O interface 307 is also connected to the address bus and the data bus D. The I/O interface 307, receiving the display-transfer signals I and II and the clockwise and counterclockwise signals, operates to rewrite the contents of the RAM in the data memory 305.

A method of interrupting data from the keyboard unit 20 will be described with reference to flow charts in FIGS. 5 and 6.

Figure 5:
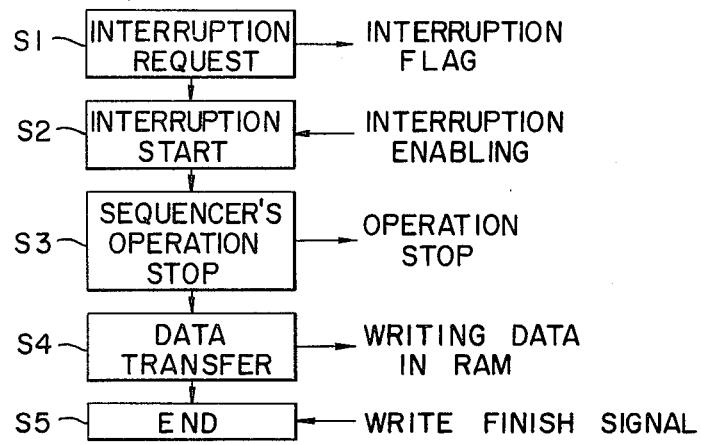
FIG. 5 is a flow chart for interrupting a single data from the keyboard unit.
Figure 6:
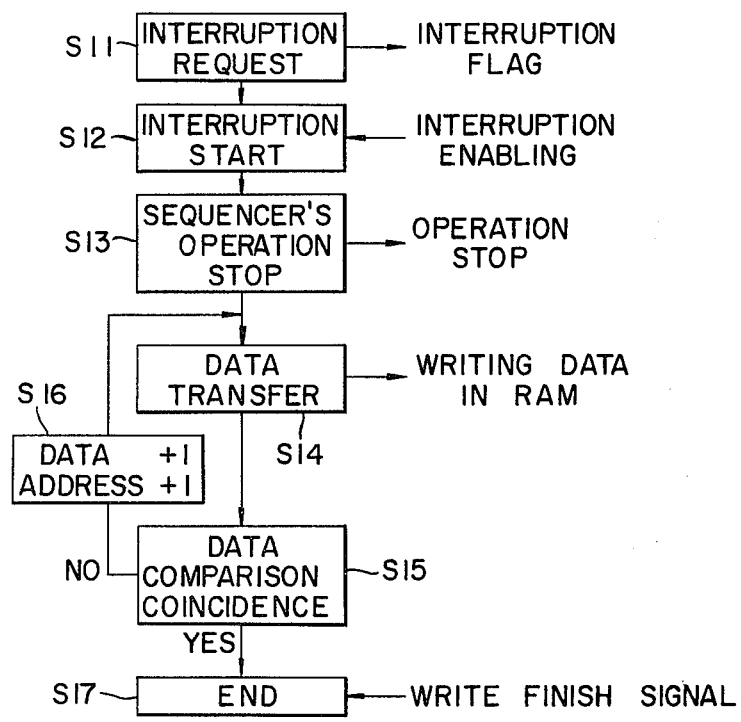
FIG. 6 is a flow chart for interrupting successive data.

In order that the tool numbers are interrupted in the addresses corresponding to the tool number displaying light emission diodes one at a time sequentially or at random, after a preparatory operation of setting the keyboard unit 20 for a single-data interruption has been carried out, the tool numbers are specified in accordance with the flow chart in FIG. 5.

In Step $S_1$ in FIG. 5, an interruption flag is provided in response to an interruption request. When an interruption enabling signal is provided by the sequencer 30, the interruption is started in Step $S_2$. In Step $S_3$ the operation of the sequencer 30 is suspended, and the data are transferred in Step $S_4$. In other words, the tool number which has been specified by depressing digit key switches for instance, the key switches 0 and 2 in the preparatory operation is transferred into the RAM. In this case, the pot position $P_3$ (FIG. 1) where a tool is inserted or taken out is specified as "02", and therefore a tool having a tool number "2" must be inserted into the pot. Any number from "1" to "99" can be specified as a tool number. According to this specification, data "02" is stored, as "00000010" in hexadecimal notation, in the address 03 in the RAM of the data memory. In Step $S_5$, one data writing operation is completed in response to a write finish signal. Similarly, all the tools are inserted into the respective pots with the tool numbers specified one at a time, so that the data representative of the tool numbers of the tools are stored in the RAM.

Successive tool numbers can be set as follows: First, at the pot position $P_3$, a No. 1 tool is inserted, and then after the magazine is stepped one pitch counterclockwise, a No. 2 tool is inserted. After all the tools have been inserted into the pots, the No. 1 tool is set at the pot position $P_1$ which is the tool exchange position. After a preparatory operation has been done to set the keyboard unit 20 for successive data interruption, the tool numbers are set in accordance with the flow chart in FIG. 6.

In Step $S_{11}$, an interruption flag is provided on an interruption request. In Step $S_{12}$, the interruption is started in response to an interruption enabling signal from the sequencer. In Step $S_{13}$ the operation of the sequencer is suspended, and in Step $S_{14}$ the data are transferred into the RAM. Thus, a tool number "01" is stored in the address 01 in the RAM of the data memory 305. In Step $S_{15}$ the set tool number "01" is compared with a tool number "20" (twenty tools being employed in this case). Since the comparison result is "NO", Step $S_{16}$ is effected. In Step $S_{16}$, one (1) is added to the tool number to obtain a tool number "02" while one is added to the address number to obtain an address number 02, for the next writing operation. Step $S_{14}$ is effected again for writing a tool number. When a tool number "20" is obtained through Steps $S_{15}$ and $S_{16}$, then the comparison result is "YES". Therefore, in Step $S_{17}$ the operation of writing the successive tool numbers is completed with a write finish signal.

Figure 7:
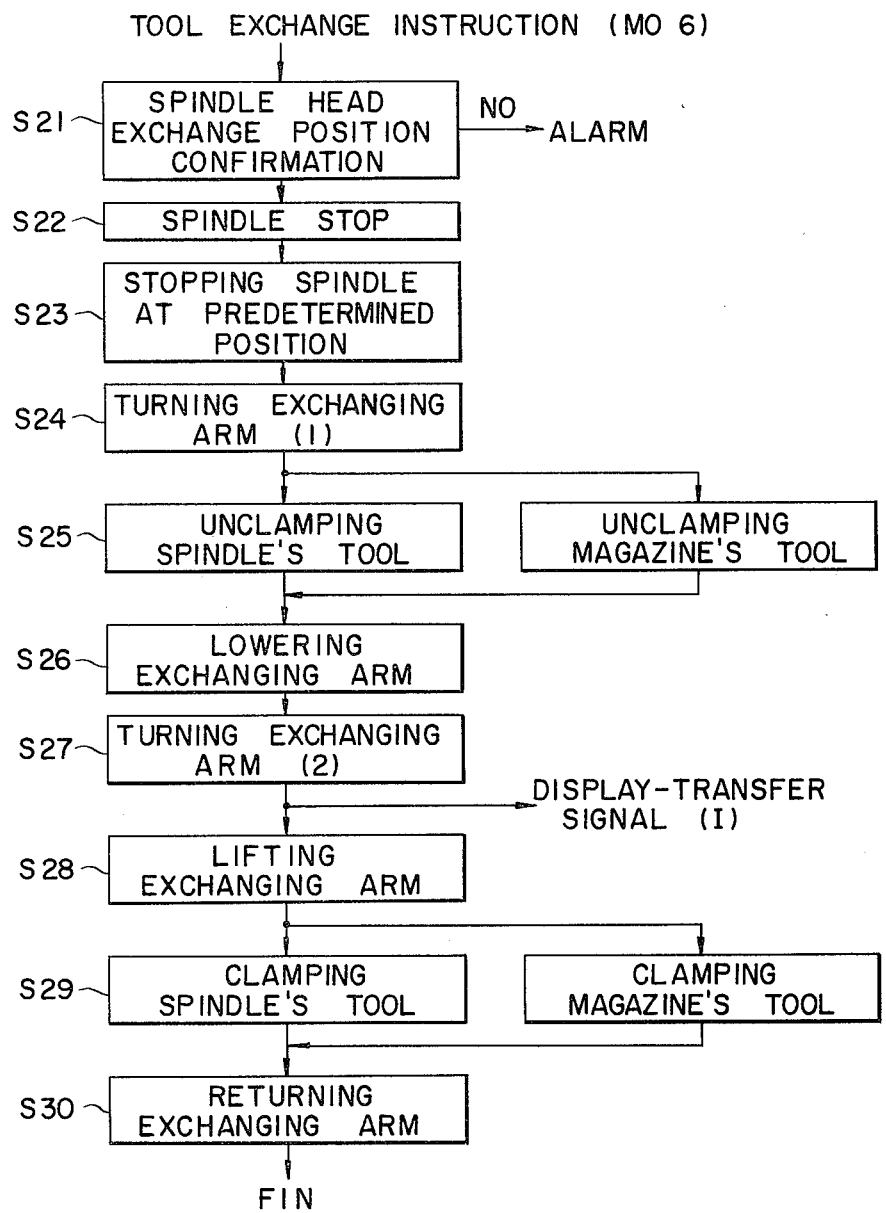
FIG. 7 is a flow chart for a tool exchange instruction.
Figure 8:
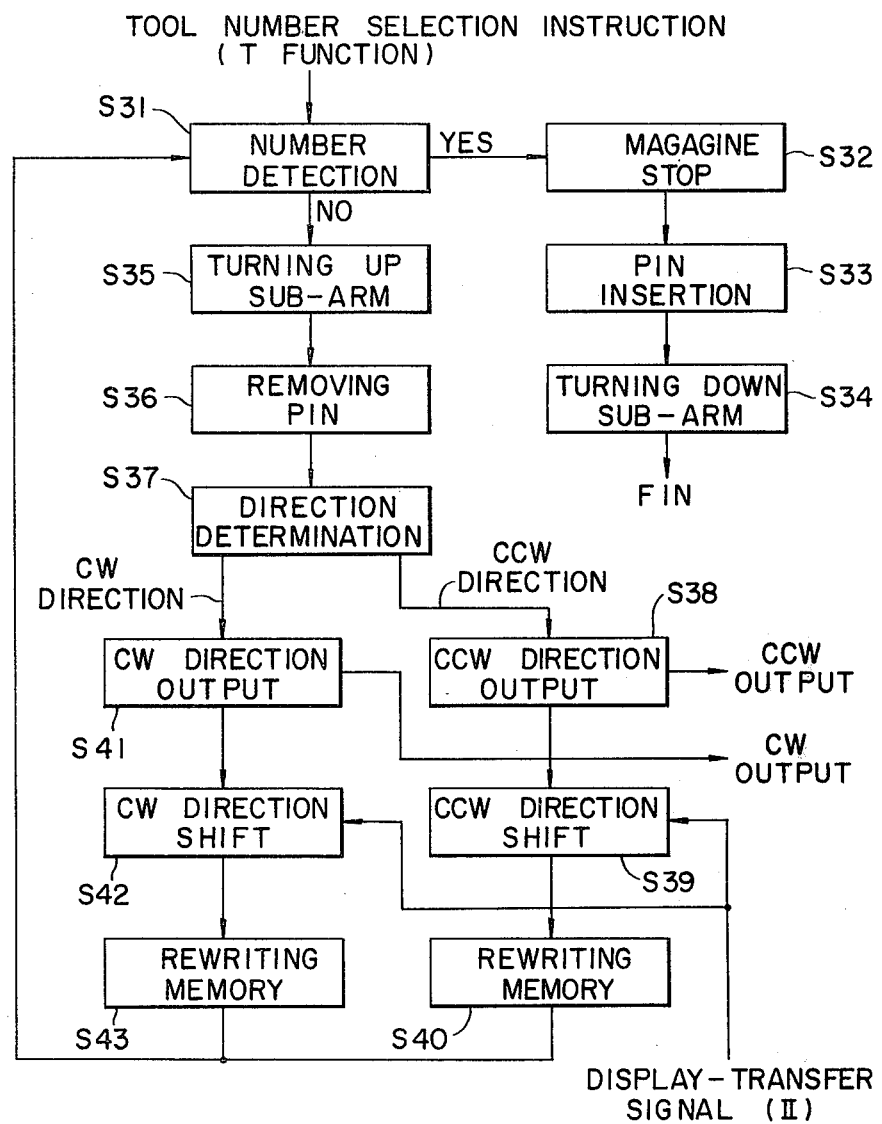
FIG. 8 is a flow chart for a tool selection instruction.
Figure 9:
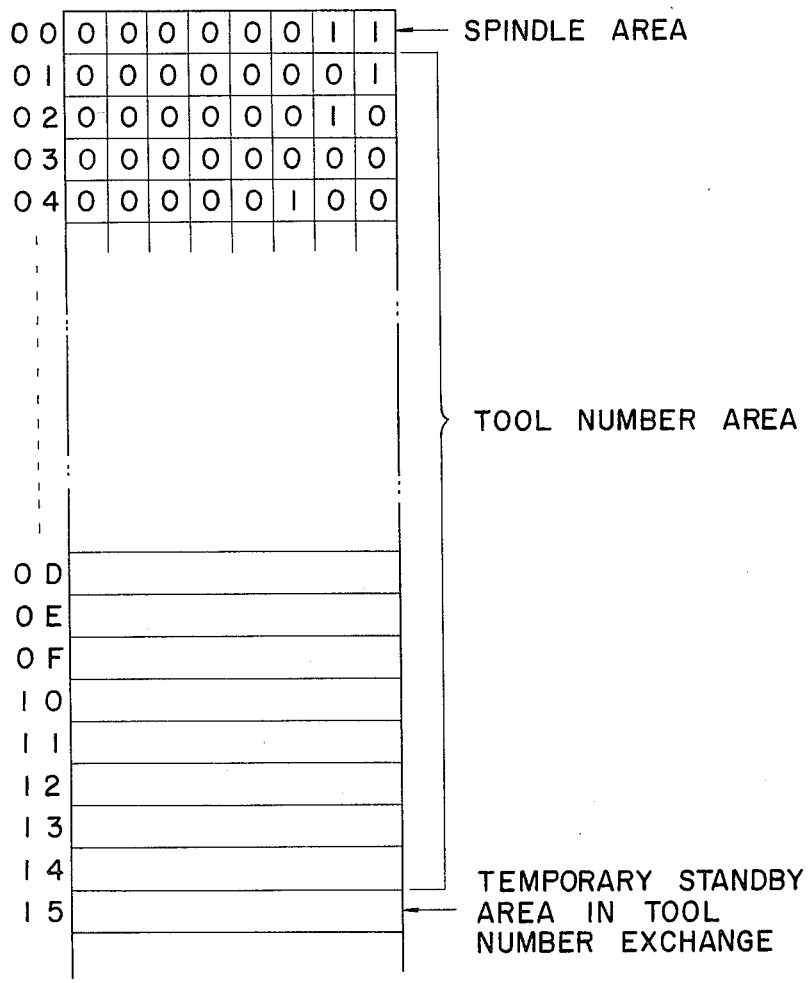
FIG. 9 is an explanatory diagram showing addresses in a data memory.

The operation of the tool machine according to the invention will be described with reference to FIGS. 7, 8 and 9.

It is assumed that the tools are accommodated in the pots $P_1$ (tool exchange position), $P_2$, $P_3$, . . . and $P_4$ in the order of the tool numbers, respectively, the pot $P_2$ has been turned vertically by the sub-arm 9 to be in standby state, and the No. 3 tool which was in the pot $P_3$ has been fixed to the spindle.

In response to a tool exchange instruction of a mode $M_{06}$ (FIG. 7), in Step $S_{21}$ it is detected whether or not the spindle head 6 is at the tool exchange position. If the detection result is "NO", an alarm signal is generated (the description of the operation responding to the alarm signal being omitted). If "YES", Step $S_{22}$ is effected to detect whether or not the spindle 7 is maintained stopped. If the detection result is "YES" (the description of some operations being omitted), Step $S_{23}$ is effected to index the spindle 7 to detect if the spindle 7 is stopped at a predetermined position. (The description of some operations is omitted). In Step $S_{24}$, the tool exchanging arm 10 is turned through 30° to the tool gripping position from the standby position. When the tool is gripped by the arm, Step $S_{25}$ is effected so that the No.3 tool on the spindle 7 and the No.1 tool in the pot 8a of the sub-arm 9 turned down vertically from the magazine 8 are uncramped. In Step $S_{26}$, the tool exchanging arm 10 is moved downwardly to pull out the two tools simultaneously. In Step $S_{27}$, the tool exchanging arm 10 is turned through 180° to exchange the old tool, i.e. the No.3 tool for the new tool, i.e. the No.1 tool. At the end of the turn of the tool exchanging arm 10, the latter 10 depresses the limit switch to produce the display-transfer signal I. The signal I is inputted through the interface 307. As a result, the data "03" representative of the No.3 tool stored in the address "00", for the spindle tool, of the RAM in the data memory is temporarily stored in a retracting address "15", the data "01" in the address "01" is stored in the address "00", and then the retracted data "03" is stored in the address "01". In accordance with this data replacement, data are transferred to the display unit 40, where new numbers are displayed. More specifically, the number "03" displayed on the light emission diode $L_0$ is changed to the number "01", while the number "03" instead of the number "01" is displayed on the light emission diode $L_1$. Upon completion of the turn of the tool exchanging arm 10, Step $S_{28}$ is effected, so that the tool exchanging arm 10 is moved upwardly, and the old tool, or the No.3 tool, is inserted into the pot $P_1$ while the new tool, or the No.1 tool, is fitted to the spindle 7. In Step $S_{29}$ the tool on the spindle 7 and the tool in the pot $P_1$ are clamped, respectively. In Step $S_{30}$, the tool exchanging arm 10 is turned through 30° in the opposite direction to the standby position. Thus, the tool exchanging operation has been achieved.

Next, in response to a tool number selection instruction (FIG. 8) for the magazine having a T function, it is detected in Step $S_{31}$ whether or not the instructed tool number, for instance a tool number "5", coincides with a tool number "1" indexed at the tool exchange position $P_1$. If the detection result is "YES", Step $S_{32}$ is effected so that the turn of the magazine 8 is stopped, and in Step $S_{33}$ a pin is inserted to stop the sprocket of the magazine 8. In Step $S_{34}$ the sub-arm 9 holding the pot at the exchange position is turned down. Thus, the tool number selection has been accomplished. However, in this case the detection result is "NO". Therefore, in Step $S_{35}$ the sub-arm 9 is turned up. In Step $S_{36}$, the pin is pulled out to allow the sprocket of the magazine to rotate. In Step $S_{37}$, it is determined whether the magazine should be turned clockwise or counterclockwise to select the shortest way to the tool exchange position. If it is determined from the positional relationship between the instructed tool number "5" and the tool number "1" at the exchange position, then in Step $S_{38}$ a signal for turning the magazine counterclockwise is provided. In Step $S_{39}$ the sprocket is driven, and at the end of one pitch step of the sprocket the two limit switches are operated to confirm that the magazine has turned counterclockwise, and to output the display-transfer signal II and a one-pitch shift completion signal, so that in Step $S_{40}$ the contents of the data memory 305 are rewritten. In this rewriting operation, in order to store the data with the addresses in the RAM shifted by one address, the data in the address "14" is stored temporarily in the retracting address "15". Next, the data in the address "13" is stored in the emptied address "14", and finally the data retracted from the address "14" is stored in the emptied address "01", so that all the data are shifted by one address in the positive (+) direction. Accordingly, the data added with (+1) is displayed by the light emission diode on the display unit; however, "01" is displayed by the light emission diode $L_{20}$. In response to a memory rewrite completion signal, in Step $S_{31}$ again it is detected whether the instructed tool number "05" coincides with the tool number "02", at the exchange position, in the address "01" which has been rewritten. In this case, the detection result is "NO", and therefore the operations of the same Steps are carried out again.

If, on the other hand, it is determined that the magazine should be turned clockwise in Step $S_{37}$, then Step $S_{41}$ is effected so that a signal for turning the magazine clockwise is provided. Thus, the magazine is turned clockwise. In Step $S_{42}$, at the end of one pitch step of the sprocket the two limit switches are operated to confirm that the magazine has turned clockwise, and to output the display-transfer signal II to provide a one-pitch shift completion signal. In Step $S_{43}$ the contents of the RAM in the data memory 305 are rewritten. In this case, the data are stored with all the addresses shifted by one address in the negative direction. That is, the data in the address "01" is temporarily stored in the retracting address "15", and the data in the address "02" is stored in the emptied address "01". Finally, the data in the address "15" is stored in the address "14". Accordingly, the display of the light emission diodes on the display unit is effected in the opposite circulation. Upon provision of a rewrite completion signal, Step $S_{31}$ is effected again to determine whether or not the instructed tool number coincides with a tool number at the exchange position. The operations in the same Steps are carried out to achieve the tool number selection.

As is apparent from the above description, in the invention, the display means, the display contents of which are rewritten in response to the instructions, are provided in correspondence to the pot numbers of the magazine and the spindle, and the tool number displays are automatically replaced in synchronization with the tool selection and the tool exchange. Accordingly, the tool number displays can be recognized in correspondence to the tools no matter how the tools are replaced or exchanged, at all times. Accordingly, the arrangement of the numbers of the tool on the spindle and of the tools in the magazine can be detected at a glance, and therefore the tools can be readily replaced or prepared, which contributes to an improvement of the operability. Furthermore, the method according to the invention is much simpler than the intricate tool coding method, and the display on the display panel can be observed at a dark place outdoor.

What is claimed is:

1. A numerically-controlled tool machine including a tool magazine having a plurality of selectively indexed storage locations for storing respective of a plurality of tools, a tool exchanging arm turnable and axially movable between said magazine and a spindle rotatably coupled to a spindle head to exchange a tool, and having a function of optionally setting and storing tool numbers in memory means in control means according to an operation program, comprising:

display means for displaying for each of said storage locations the tool number of the respective tool stored therein;

means for selectively displacing at least one of said tools from one storage location to another in accordance with a tool selection or exchange designated by said operation program;

means for automatically shifting positions where the respective tool number of said at least one displaced tool is stored in said memory means in correspondence with selective displacement of said at least one tool to another storage location; and said display means including means for displaying for each storage location the respective tool number of the tool stored therein, including the tool number shifted in position in said memory means in correspondence with the storage location to which said at least one of said tools is displaced;

whereby the tool numbers displayed by said display means are changed in association with the tool displacement.

* * * * *